(12) United States Patent
Taniguchi et al.

(10) Patent No.: US 6,483,985 B1
(45) Date of Patent: Nov. 19, 2002

(54) APPARATUS REPRODUCING SIGNALS ON SLOW REPRODUCTION

(75) Inventors: Masatoshi Taniguchi, Toyonaka (JP); Takeshi Otsuka, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/190,277

(22) Filed: Nov. 13, 1998

(30) Foreign Application Priority Data

Nov. 13, 1997 (JP) .............................. 9-311764

(51) Int. Cl.⁷ ................................ H04N 5/91
(52) U.S. Cl. .......................... 386/68; 386/81
(58) Field of Search .............. 386/46, 68, 69, 386/77, 79, 81

(56) References Cited

U.S. PATENT DOCUMENTS

| | | |
|---|---|---|
| 5,179,451 A | 1/1993 | Takeshita et al. |
| 5,247,400 A * | 9/1993 | Asai .............. 386/69 |
| 6,243,529 B1 * | 6/2001 | Takayama et al. ........... 386/68 |

FOREIGN PATENT DOCUMENTS

| | | |
|---|---|---|
| EP | 0 500 358 A2 | 2/1992 |
| JP | 05344472 | 12/1993 |
| JP | 06268965 | 9/1994 |
| JP | 09261591 | 3/1997 |

* cited by examiner

*Primary Examiner*—Huy Nguyen
(74) *Attorney, Agent, or Firm*—Wenderoth, Lind & Ponack, L.L.P.

(57) ABSTRACT

A digital video cassette recorder reproduces signals which have been compressed to digital data and recorded in predetermined M tracks (M≧1) with helical scan in the unit of page consisting of N frames (N≧1). Further, position data have been added to the digital data on recording. On reproduction, the position data are detected to determine which reproduction position is reproduced, and a control signal to designate a field to be output is generated by observing the reproduction position during a frame period. A first storage device stores decoded data in the unit of N frames, while a second storage device delays the data a time of one field. By observing the reproduction situation with the position data, a memory controller controls reading from the first storage device according to the control signal, while a switch selects data to be output between data from the first storage device and data from the second storage device according to the control signal.

13 Claims, 8 Drawing Sheets

APPARATUS REPRODUCING SIGNALS ON SLOW REPRODUCTION

BACKGROUND OF THE INVENTION

1. Field of the Invention

The present invention relates to a digital video cassette recorder where digital signals are subjected to high efficiency compression for recording and in particular to slow reproduction of signals in such a digital video cassette recorder.

2. Description of Prior Art

In a digital video cassette recorder, video signals are digitized, and the digital signals are subjected to high efficiency coding and recorded in a plurality of tracks with helical scan. Slow reproduction is a function of a digital video cassette recorder, and signal processing on slow reproduction is described, for example, in Japanese Patent laid open Publications 3-132183/1991, 5-344472/1993 and 9-261591/1997.

In a prior art digital video cassette recorder described in Japanese Patent laid open Publication 3-132183/1991, signals consist of a series of unit period such as horizontal period (referred to as block), and an index signal is added to each block. An index number indicates a number of field to which the block belongs and a number of block. When signals are reproduced, an index number is reproduced to determine which field is to be reproduced. Reproduced signals are subjected to error correction and the like for each block and stored in a frame memory. In slow reproduction, the data of one field stored in the frame memory are read in the unit of field according to change in the detected index number.

In the digital video cassette recorder, the index numbers added on recording are reproduced, and the output field is controlled on reproduction. However, if data are subjected to high efficiency compression in the unit of field or frame and subjected to shuffling recording, index number cannot be defined when signals are recorded. Then, the output field cannot be controlled.

Another prior art digital video cassette recorder described in Japanese Patent laid open Publication 5-344472/1993 solves this problem. Data are compressed at a high efficiency in the unit of fields (group) and subjected to shuffling recording. When compressed data in a plurality of fields (or a group) are read, truck index numbers which have been added on recording are reproduced to detect which position is reproduced. Signals of each field are output according to the detection in the unit of group. However, when compressed data are reproduced, the output of data are completed in each group. Then, the output time for a field on slow reproduction varies largely among fields. Thus, the reproduced pictures are not smooth on slow reproduction.

In a prior art digital image signal reproduction apparatus described in Japanese Patent laid open Publication 9-261591/1997, when compressed image data are read in the unit of a plurality of fields (or a group), the last field in a group and the first field in a following field can be output as one frame in slow reproduction. Then, the output of the reproduced images is improved to continue more smoothly. However, though the operation at a particular reproduction speed is described, it is not described how the slow reproduction is controlled at any reproduction speed.

SUMMARY OF THE INVENTION

An object of the present invention is to provide an apparatus where an image can be reproduced smoothly on slow reproduction.

An apparatus according to the invention reproduces data recorded on a tape in slow reproduction. The digital video signals are compressed and recorded in predetermined M tracks (M≧1) on a tape with helical scan in the unit of a page consisting of N frames (N≧1), and position data representing position in the M tracks are added to the digital data on recording at predetermined positions in the M tracks. A reproduction processor converts signals reproduced from a magnetic tape to compressed digital data. A decoder decodes the compressed digital data reproduced by the reproduction processor to digital data, and a first storage device stores the decoded data in the unit of N frames. Further, a second storage device delays data received from the first storage device by a time of a frame. On the other hand, a position detector detects the position data in the data reproduced by the reproduction processor to determine which reproduction position is reproduced in an area where the data in a page are recorded. Thus, the situation of data reproduction is observed by detecting the position data. A read controller receives the reproduced position during a frame period and generates a control signal according to the determined reproduction position observed during a frame period. The control signal is determined to make output time of a frame even. A memory controller controls read from the first storage device according to the control signal, while a switch selects data to be output between data received from the first storage device and data received from the second storage device according to the control signal.

Preferably, a frame consists of two fields. The second storage device delays data received from the first storage device by a time of a field. The read controller generates the control signals by checking whether reproduction of an area of M/(2N) tracks of an area recording the data of one page is completed in the former half or in the latter half of a frame period and whether the completion of the reproduction of an area of M/(2N) tracks is zero, one or two times in a frame period, the control signal being determined to make output time of a field even.

Preferably, the memory controller controls the reading according to a combination of the control signal of a prior frame and that of a current frame.

Preferably, the switch selects the data to be output according to a combination of the control signal of a prior frame and that of a current frame.

Preferably, the decoder comprises an inner correction decoder and an outer correction decoder. The position data are added to the digital data subjected to outer correction. The inner correction decoder subjects the data reproduced by the reproduction processor to inner correction decoding. The read controller receives the data from the first inner correction decoder and detects the position data therein.

Preferably, the position data includes a first position information representing a position in a track and a second position information representing a track in the M tracks.

Preferably, the position detector determines the second position information detected at the last in a scan and detects the first position information detected first after the determined second position information is changed.

Preferably, the second position information is recorded to have a margin relative to a data to be determined currently.

Preferably, data are recorded to the tape with shuffling in the M tracks and the reproduction processor converts the recorded data to the digital data without shuffling.

Preferably, the read controller generates the control signal further by taking direction of tape running into account.

In a method according to the invention for reproducing signals recorded on a tape in slow reproduction, the signals are compressed to digital data and recorded in M tracks (M≧1) on a tape with helical scan in the unit of a page consisting of N frames (N≧1), and position data representing position in the M tracks are added to the digital data on recording at predetermined positions in the M tracks. On reproduction, signals reproduced from a magnetic tape are converted to compressed digital data. The reproduced digital data are decoded and the decoded data are stored in a first storage device in the unit of N frames. Further, data received from the first storage device are stored in a second storage device for delay by a time of a frame. On the other hand, the position data in the reproduced data are detected to determine which reproduction position is reproduced in an area where the data in a page are recorded. A control signal is generated according to the determined reproduction position observed during a frame period, the control signal being determined to make output time of a frame even. Reading from the first storage device is controlled according to the control signal, and data to be output are selected according to the control signal between data received from the first storage device and data received from the second storage device.

Preferably, in the method, a frame consists of two fields. The data received from the first storage device are delayed by a time of a field. The control signals is generated by checking whether reproduction of an area of M/(2N) tracks of an area recording the data of one page is completed in the former half or in the latter half of a frame period and whether the completion of the reproduction of an area of M/(2N) tracks is zero, one or two times in a frame period. The control signal is determined to make output time of a field even.

Preferably, in the method, the position data includes a first position information representing a recording position in a track and second position information representing a track position in the M tracks.

An advantage of the present invention is that images can be reproduced smoothly on slow reproduction in a digital video cassette recorder.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
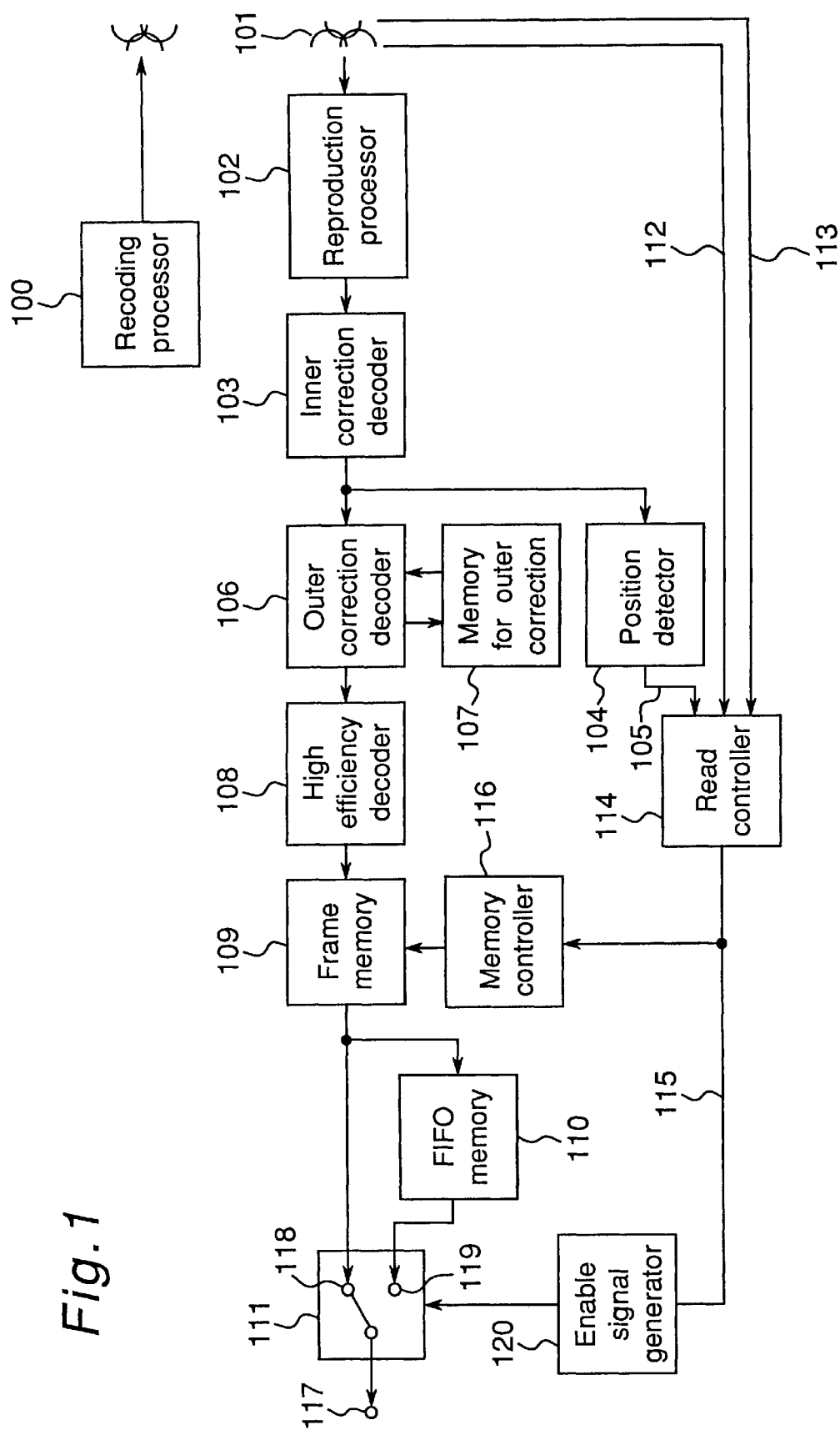
FIG. 1 is a block diagram of a video signal processor of a digital video cassette recorder for realizing a control method according to an embodiment of the invention.

Referring now to the drawings, wherein like reference characters designate like or corresponding parts throughout the several views, FIG. 1 shows a video signal processor of a digital video cassette recorder according to an embodiment of the invention. In the video signal processor, a recording processor 100 converts digital signals to analog rf signals and records them to a magnetic tape. It is explained here how signals are recorded to a magnetic tape with a magnetic head. One page of signals consists of N frames where N is an integer equal to or larger than one. In order to decrease the storage capacity of data, data are subjected to high efficiency coding, for example, by using discrete cosine transformation, vector quantization and variable length coding for the digital data. Next, the compressed digital data of one page are blocked. Then, digital data for one page are shuffled in M tracks where M is an integer equal to or larger than one and recorded with helical scan to a magnetic tape. An area in correspondence to M/(2N) tracks represents an area wherein data of one field can be considered to be recorded after data of N frames are subjected to high efficiency coding and recorded as one page.

In each track, the digital data are recorded in the unit of a recording block or a sync block consisting of a predetermined number of sync data. When signals are recorded, first parity codes for inner correction and second parity codes for outer correction are added to the recorded data. Actually, a second parity code is added first for each sync data. Then, to the data in a sync block to which the second parity codes have been added, a first parity code s are added. Further, as a feature of this embodiment, position data which will be explained later is added on recording to the data in the unit of sync block. The position data represents a recording position in the M tracks.

In this example, the position data includes first position information and second position information. The first position information represents a position of a track in M tracks. Thus, it is a block number which represents a sync block in a track, and if P sync blocks are recorded in a track, the first position information is an integer from 1 to P. The second position information represents a position of a track in M tracks or in an area wherein one page of data are recorded, and it is a track number of an integer from 1 to M.

Next, reproduction of signals from a tape is explained. A reproduction processor 102 processes rf signals detected with a magnetic head 101 from a magnetic tape to reproduce digital data. Then, an inner correction decoder 103 performs inner correction for the reproduced data according to the first parity codes added for inner correction on recording. The corrected data are supplied to an outer correction decoder 106 and to a position detector 104.

The outer correction decoder 106 performs outer correction for the data received from the inner correction decoder 103 with a memory 107 provided for outer correction by using the second parity codes added for outer correction on recording. Then, a high efficiency decoder 108 decodes the data received from the outer correction decoder 106, and an N frame memory 109 stores the decoded data of one page consisting of N frames. Further, a first-in first-out (FIFO) memory 110 is provided as a second memory for delaying the data read from the first memory 109 by a time of one field.

A read controller 114 receives a position signal 105 generated by the position detector 104 according to the position data detected in the data received from the inner correction decoder 103. Further, it also receives a direction signal 112 and a speed signal 113 from the magnetic head 101. The direction signal 112 represents rotation direction (forward or reverse) of a capstan motor for driving the magnetic tape, while a speed signal 113 represents whether the speed of the capstan motor is slow reproduction speed or normal one. The read control signal 115 is supplied to a memory controller 116 for the N frame memory 109 and an enable signal generator for the switch 111. The memory controller 116 controls a field to be output from the N frame memory 109. A switch 111 as a means for switching read data selects field signals 118 supplied from the N frame memory 109 or delays field signals 119 supplied from the FIFO memory 110 which has delayed the field signals 118 by a time of one field. Then, the switch 111 outputs the selected signals through an output terminal 117. The selection by the switch 111 is controlled by an enable signal generated by an enable signal generator 120 according to the read control signal 115 supplied by a read controller 114.

Important operations on slow reproduction are explained in detail below, especially on the position detector 104, the read controller 114, the memory controller 116 and the switch 111.

The position detector 104 detects first and second position information in the recorded data which have been added on recording in the unit of sink block and outputs the position signal 105 representing a position in a magnetic tape. The first position information is a block number which represents a sync block in a track. If P sync blocks are recorded in a track, the first position information is a number from 1 to P. The second position information is a track number which represents a track in M tracks of one page, and the first position information is a number from 1 to M.

Figure 2:
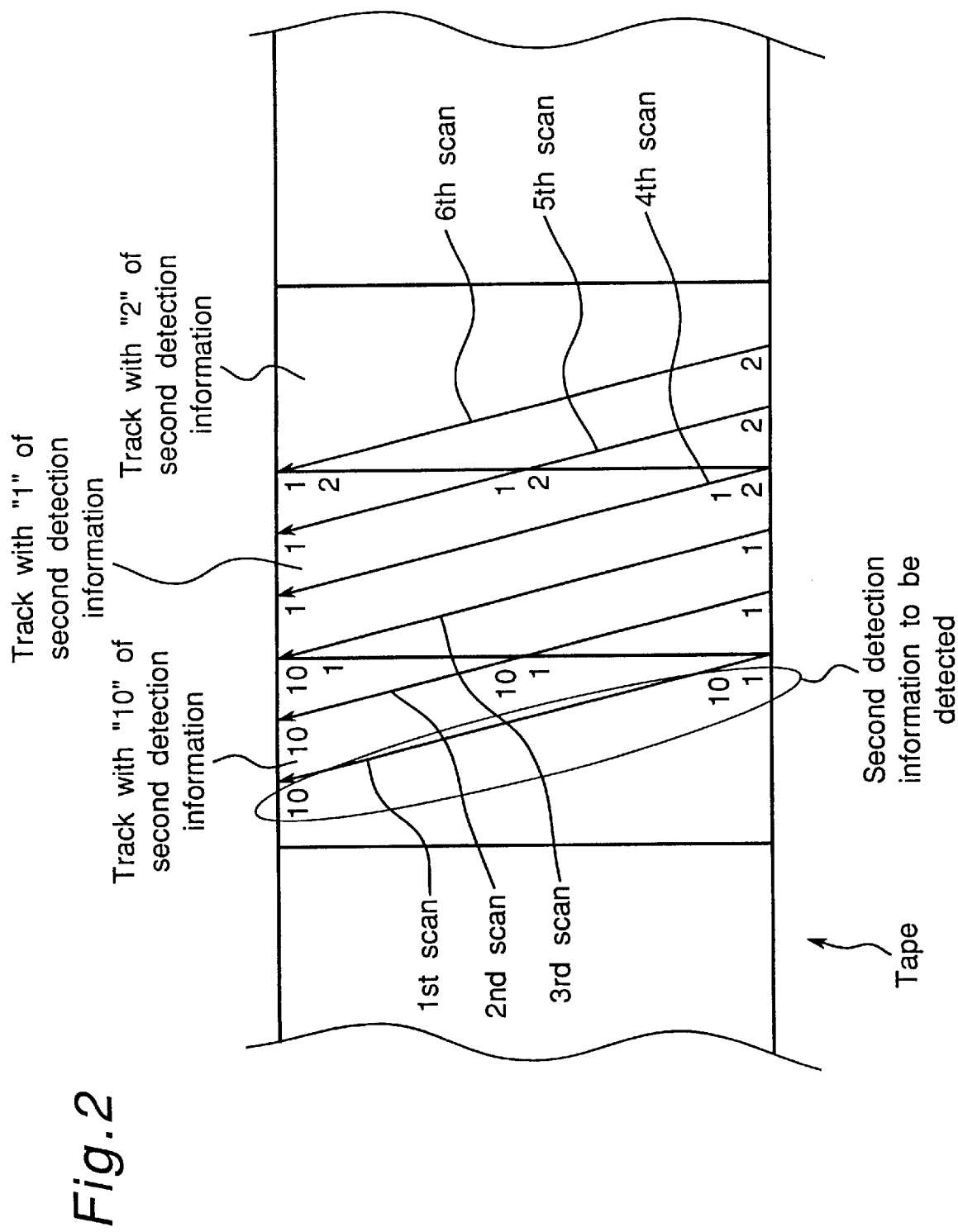
FIG. 2 is a diagram for explaining relation of track trace patterns of magnetic head and second information detected on slow reproduction of 1/3 times speed.

In the slow reproduction the magnetic head 101 scans a magnetic tape and crosses a plurality of tracks. Because the same track is scanned repeatedly, the same first and second position information are detected repeatedly. FIG. 2 shows an example of slow reproduction at 1/3 times speed wherein three tracks having second data of 10, 1 and 2 are shown. The speed of slow reproduction is expressed relative to the speed of normal reproduction, and "1/3" means that the speed of reproduction is 1/3 times that of normal reproduction. Slant lines in FIG. 2 represent traces of the magnetic head 101 for reproduction, and arrows thereof represent scan direction. The numerals shown in FIG. 2 are the second position information along the traces of the magnetic head in the scans. In the example, the track on which the second position information of 10 is added is detected six times. In the first, second and third scans, the second position information to be detected is changed from 1 to 10, while in the fourth, fifth and sixth scans, the second position information to be detected is changed from 2 to 1. Therefore, it is difficult to determine which position is reproduced actually.

Figure 3:
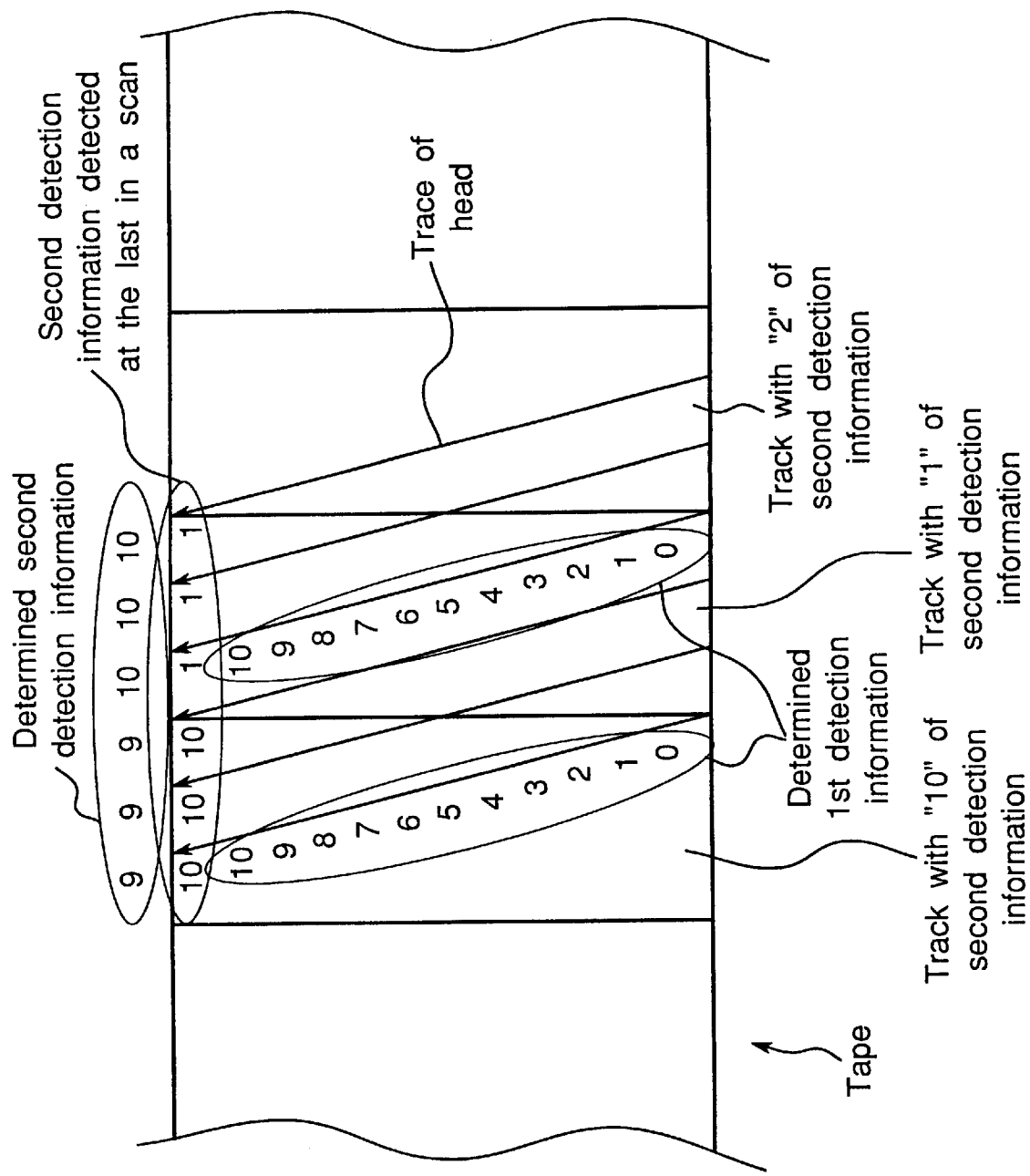
FIG. 3 is a diagram for explaining relation of track trace patterns of magnetic head and second information determined on slow reproduction of 1/3 times speed.

Then, as shown in FIG. 3, the first position information is detected at the last in a scan. The same track may not necessarily be read once, and when a track is read, it is not sure that the same track is not read again. Thus, in order to prevent erroneous detection, the second position information to be determined has a margin relative to a current information to be detected. In the example shown in FIG. 3, the margin is one. Thus, a track from which the signals have been reproduced completely is detected, and the track position in the tape is identified. As to the first position information, it is recognized when detected first after the determined second position information is changed. Thus, a position in a track is identified. In the example shown in FIG. 3, after the determined second position information is changed, for example, from 10 to 1, the first position information of 0 to 10 are determined.

Figure 4:
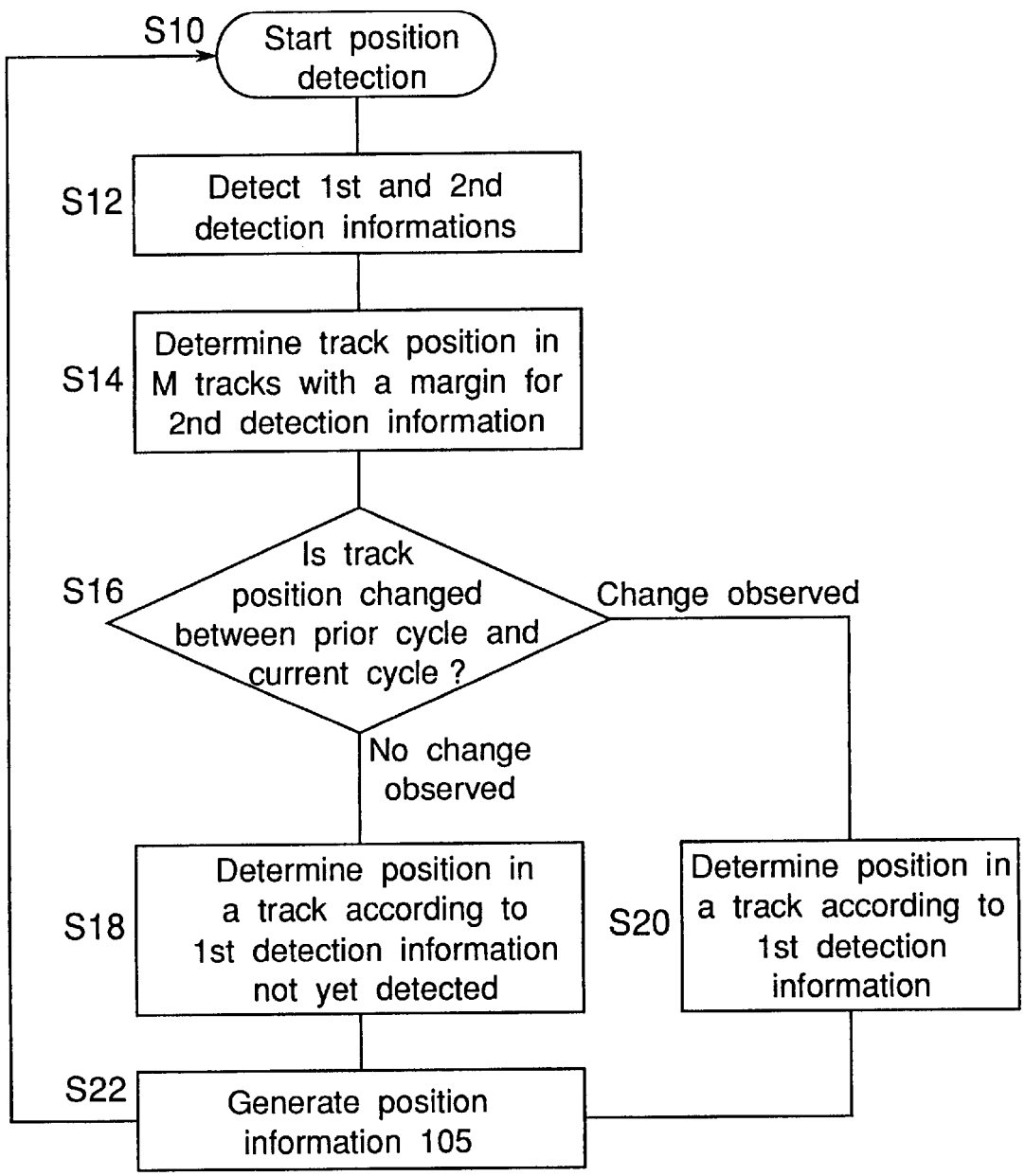
FIG. 4 is a flowchart of generation of a position information by a position detector.

FIG. 4 shows a flow of generation of the position information 105 by the position detector 104. When the position detection is started (step S10), the first and second position informations are detected in the reproduced data (step 512). Next, the track position in the M tracks is determined with a margin for the second position information, as explained above (step S14). Then, the track position in the M track in a prior cycle is compared with that in the M tracks in the current cycle (step S16) If there is no change, the position in a track is determined according to the first position detection information not yet detected (step S16). On the other hand, if there is a change, the position in a track is determined according to the first position detection information (step S18). Then, the position information 105 is generated according to the track position and the position in the track (step S20). It is explained here that this flow is performed by a microprocessor provided in the position detector 104, but it may be replaced with hardware components.

The position signal 105 provided for representing a position in a magnetic tape is generated by the position detector 104 according to the first and second position informations. Though it is mentioned above that an area in correspondence to M/(2N) tracks represents an area wherein data of one field can be considered to be recorded, the amount of data in the area in correspondence to M/(2N) tracks is actually different among fields, and data of one field is not necessarily recorded in an area in correspondence to M/(2N) tracks. Further, because the data are recorded after shuffling, M/(2N) tracks from the top of one page is not necessarily the first field. However, if we simply assume that data of. one field are recorded in M/(2N) tracks, it can be the that the position signal 105 is at high level in the former half of a field in each frame and at low level in the latter half thereof. That is, the position signal 105 is a signal changed repeatedly between high level and low level each time when an area in correspondence to M/(2N) tracks is reproduced from the top of the M tracks.

Figure 5:
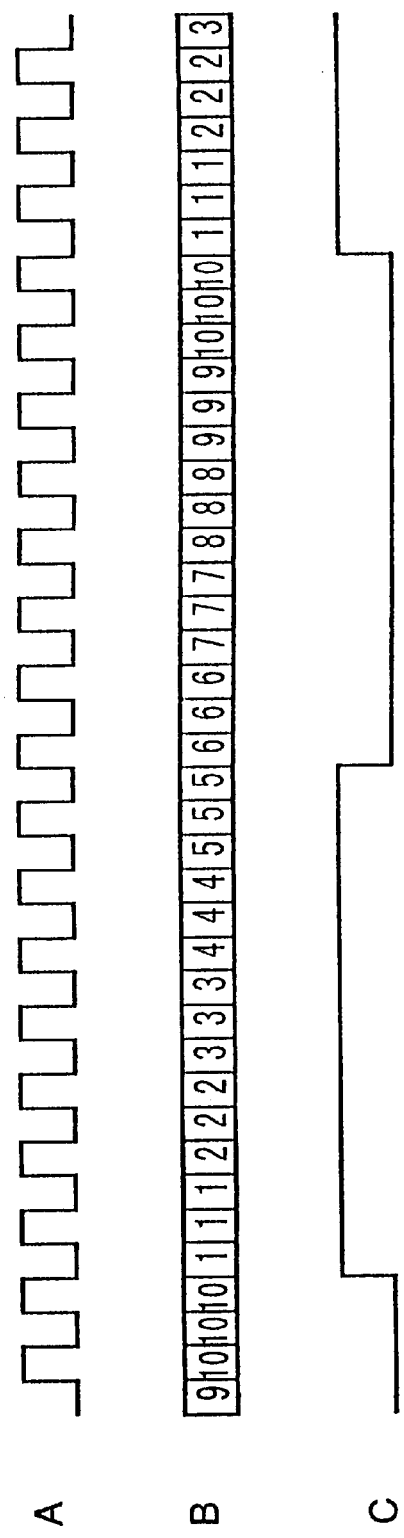
FIG. 5 is a time chart for explaining relation of determined second detected information and position relation on slow reproduction of 1/3 times speed (in a case of N=1, M=10, and P=10)

FIG. 5 shows an example of slow reproduction of 1/3 times speed where N=1, M=10 and P=10. In this case, M/(2N)=5. Thus, the position signal 105 is changed between high level and low level each time when an area in correspondence to 5 tracks is reproduced from the top of the M tracks. FIG. 5 shows switching signal (A) for the magnetic head, the determined second position information (B), and the position signal 105 (C) which is at high level for the second position information between 1 and 5 and at low level for the second position information between 6 and 10.

Figure 6:
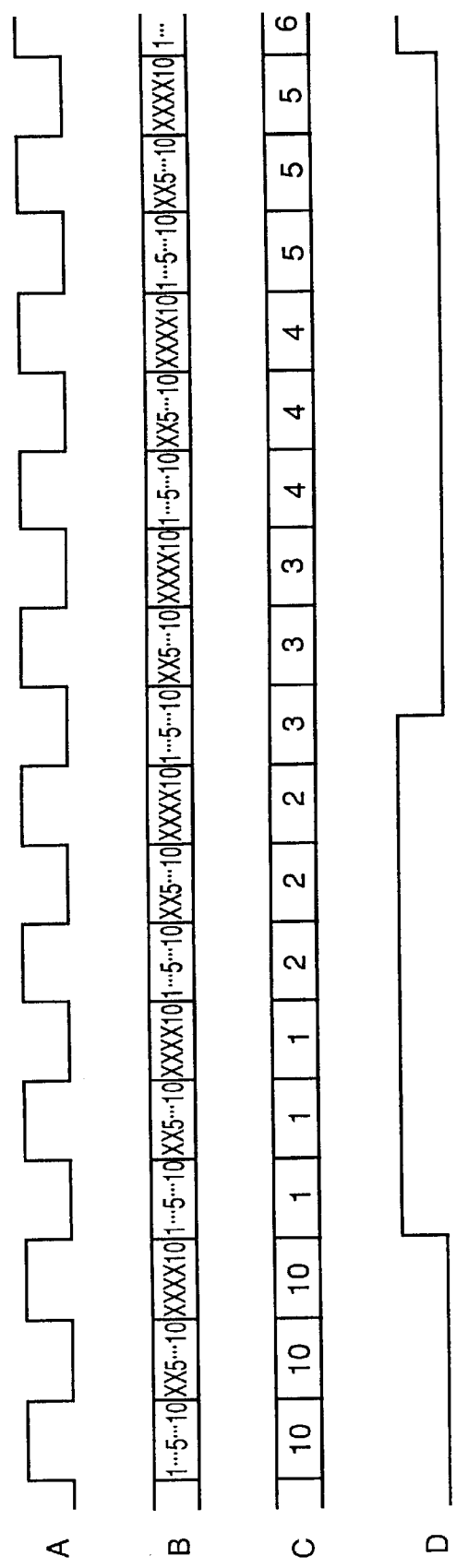
FIG. 6 is a time chart for explaining relation of determined first and second detected information and position relation on slow reproduction of 1/3 times speed (in a case of N=2, M=10, and P=10)

FIG. 6 shows another example of slow reproduction at 1/3 times speed where N=2, M=10 and P=10. In this case, M/(2N)=2.5. Thus, the position signal 105 is changed between high level and low level each time when an area in correspondence to 2.5 tracks is reproduced from the top of the M tracks. FIG. 5 shows switching signal (A) for the magnetic head, (B) shows the determined first position information, (C) shows the determined second position information and (D) shows the position signal 105.

Next, read control by the read controller 114 is explained. The read controller 114 receives the position signal 105, the direction signal 112 and the speed signal 113 to generate the read control signal 115. As shown in Table 1, the read control signal 115 is determined according to a combination of the checked position signal 105 (phase thereof relative to the frame signal), the direction signal 112 and the speed signal 113. In the read control, it is checked first whether the direction signal 112 denotes normal reproduction or reverse reproduction (the first column in Table 1). The direction signal 112 is at low level for reproduction in normal direction and at high level for reproduction in reverse direction. Next, it is checked whether the speed signal 113 denotes slow reproduction or not (the second column in Table 1). The speed signal 113 is at high level for slow reproduction and at high level otherwise. Further, it is checked how the position signal 105 is changed in a frame period (the third column in Table 1). That is, it is checked whether the position signal 105 is changed in the former or latter half in a frame period. It is also checked whether the change in the position signal 105 is observed zero, one or two times in a frame period. In the third column in Table 1, it is shown schematically if the position signal 105 is changed in the former or latter half in a frame period shown at the top row for the various situations of slow reproduction.

period and whether the reproduction of an area of M/(2N) tracks is performed zero, one or two times in the frame period. The read control signal 115 is set, so that an output time for a field output through the output terminal 117 on slow reproduction (high level of speed signal 113) becomes even in correspondence to the speed of slow reproduction according to the combinations of the three signals 105, 112 and 113 shown in Table 1.

The read control signal 115 is a 3-bit signal having eight values from 0 to 7, and its uppermost bit represents rotation direction of the capstan motor or the reproduction direction. When the read control signal 115 is 0, data in the first field of a frame is output in reproduction in the normal direction. When the read control signal 115 is 1, data in the second field of a frame is output in reproduction in the normal direction. When the read control signal 115 is 2, data in the second field and those in the first field are output successively in reproduction in the normal direction. When the read control signal 115 is 3, data in the first field and those in the second field are output successively in reproduction in

TABLE 1

Read control signal

| Direction signal 112 | Speed signal 113 | Phase of position signal 105 relative to frame signal | Read control signal 115 |
|---|---|---|---|
| Low | Low | Irrelevant | 3 |
|  | High | 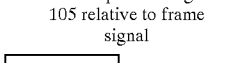 | 0 |
|  |  | 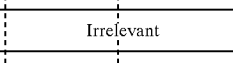 | 2 |
|  |  | 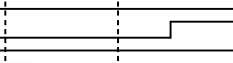 | 1 |
|  |  | 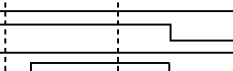 | 3 |
|  |  | 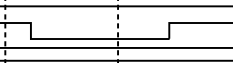 | 3 |
|  |  | 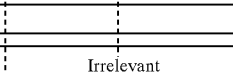 | 2 |
|  |  | 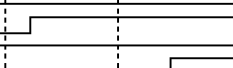 | 0 |
|  |  |  | 1 |
| High | Low | Irrelevant | 6 |
|  | High | 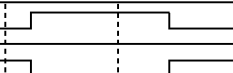 | 5 |
|  |  | 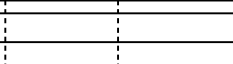 | 7 |
|  |  | 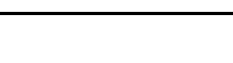 | 4 |
|  |  | 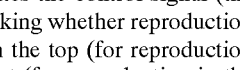 | 6 |
|  |  | 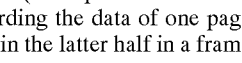 | 6 |
|  |  |  | 7 |
|  |  |  | 5 |
|  |  |  | 4 |

The read controller 114 generates the control signal (the fourth column in Table 1) by checking whether reproduction of an area of M/(2N) tracks from the top (for reproduction in the normal direction) or the last (for reproduction in the reverse direction) of an area recording the data of one page is completed in the former half or in the latter half in a frame the normal direction. When the read control signal 115 is 4, data in the first field of a frame is output in the reverse reproduction. When the read control signal 115 is 5, data in the second field of a frame is output in reproduction in the reverse direction. When the read control signal 115 is 6, data in the second field and those in the first field are output successively in reproduction in the reverse direction. When the read control signal 115 is 7, data in the first field and those in the second field are output successively in reproduction in the reverse direction.

Next, it is explained why the read control signal 115 is determined by considering the phase in the position signal 105 in a frame period shown in the third column in Table 1. As mentioned above, the read controller 114 receives the position signal 105, the direction signal 112 and the speed signal 113 and generates the read control signal 115. The read control signal 115 controls how to read data from the N frame memory 109 by the memory controller 116. The reading has to be controlled according to a reproduction position of the data to be written next to the N frame memory 109. If the position signal 105 is changed from low level or high level, it is decided that an area in correspondence to the first field is being reproduced in the data to be written next to the N frame memory 109. Then, data in the first field is read from the N frame memory 109. On the other hand, if the position signal 105 is changed from high level to low level, it is decided that an area in correspondence to the second field is being reproduced in data to be written next to the N frame memory 109. Then, data in the second field is read from the N frame memory 109.

Further, it is necessary to decide when the field to be read is changed, for example, at the top in an output frame or at a timing to output a second field in the output frame, according as the phase change position of the position signal 105 exists in the former half or in the latter half in a period of a frame. In this example, if the change position exists in the former half in a frame period, the read field is changed at the top in an output frame in the output frame, while if the change position exists in the latter half in the frame period, the read field is changed at the read timing of the second field in the output frame. If there is no change point in the period of a frame, when the position signal 105 is at high level, an area in correspondence to the first field in the data on the tape is being reproduced. Then, the first field is read from the memory. On the other hand, when the position signal 105 is at low level, an area in correspondence to the second field in the data on the tape is being reproduced. Then, the second field is read from the memory. Thus, there are the combinations shown in Table 1, and the read control signal 115 can be output in correspondence to the operation in tape reproduction.

Next, it is explained how the memory controller 116 controls the N frame memory 109 according to the read control signal 115. The memory controller 116 controls the reading from the N frame memory 109. The memory controller 116 reads data from the N frame memory 109 according to a combination of a prior read control signal in the prior frame before the current frame and a current read control signal. The reading is performed according to Table 2. In Table 2, in the combinations of the read control signals of two frames with an open circle in the column of "change", reading is performed from the next frame at the next reading. The memory controller 116 has a circuit which generates signals for accessing the N frame memory 109 to read a field designated by the read control signal 114 according to read fields shown in the second column in Table 2.

TABLE 2

Reading by the memory controller

| Combination of read control signals 115 of prior and current frames | Read field in a frame period | Change |
|---|---|---|
| 0-0 | f1 | |
| 0-1 | f1 | |
| 0-2 | f1/f2 | |
| 0-3 | f1 | ○ |
| 0-4 | f1 | |
| 0-5 | f1 | ○ |
| 0-6 | f1 | ○ |
| 0-7 | f1 | ○ |
| 1-0 | f1 | ○ |
| 1-1 | f2 | |
| 1-2 | f2 | ○ |
| 1-3 | f2 | ○ |
| 1-4 | f2 | |
| 1-5 | f2 | |
| 1-6 | f2 | |
| 1-7 | f2/f1 | ○ |
| 2-0 | f1 | |
| 2-1 | f1 | |
| 2-2 | f1/f2 | ○ |
| 2-3 | f1/f2 | |
| 2-4 | f2/f1 | |
| 2-5 | f2/f1 | ○ |
| 2-6 | f2/f1 | ○ |
| 2-7 | f2/f1 | ○ |
| 3-0 | f1/f2 | ○ |
| 3-1 | f1/f2 | |
| 3-2 | f1/f2 | ○ |
| 3-3 | f1/f2 | ○ |
| 3-4 | f2 | |
| 3-5 | f2 | |
| 3-6 | f2/f1 | |
| 3-7 | f2/f1 | ○ |
| 4-0 | f1 | |
| 4-1 | f1 | |
| 4-2 | f1/f2 | ○ |
| 4-3 | f1 | |
| 4-4 | f1 | ○ |
| 4-5 | f1 | ○ |
| 4-6 | f1 | ○ |
| 4-7 | f1 | ○ |
| 5-0 | f1 | ○ |
| 5-1 | f2 | |
| 5-2 | f2 | ○ |
| 5-3 | f2 | ○ |
| 5-4 | f2 | |
| 5-5 | f2 | |
| 5-6 | f2 | |
| 5-7 | f2/f1 | ○ |
| 6-0 | f1 | |
| 6-1 | f1 | |
| 6-2 | f1/f2 | ○ |
| 6-3 | f1/f2 | |
| 6-4 | f2/f1 | |
| 6-5 | f2/f1 | ○ |
| 6-6 | f2/f1 | ○ |
| 6-7 | f2/f1 | ○ |
| 7-0 | f1/f2 | ○ |
| 7-1 | f1/f2 | |
| 7-2 | f1/f2 | ○ |
| 7-3 | f1/f2 | ○ |
| 7-4 | f2 | |
| 7-5 | f2 | |
| 7-6 | f2/f1 | |
| 7-7 | f2/f1 | ○ |

As mentioned above, a characteristic at the reading is that reading is performed from the N frame memory 109 according to a combination of a prior read control signal before one frame and a current read control signal. At the end of a unit of N frames, the second field in a prior frame and the first field in a current frame cannot be read in a field. Then, the FIFO memory 110 and the switch 111 are controlled to provide data read from the N frame memory 109 through the output terminal 117 as intended by the read control signal 115.

Next, the switch 111 is explained. The switch 111 is controlled by the enable signal generator 120 to select the field signals 118 or the delayed field signals 119, and the enable signal generator 120 generates an enable signal according to the combination of a prior read control signal before one frame and a current read control signal as shown in Table 3. In the "active" column at the switch 111 in Table 3, "H" shows that the field signal 118 is selected, while "L" shows that the delayed field signal 119 is selected. For example, for "HL" in the active column, the field signal 118 is selected in the former half in a frame, while "L" shows that the field signal 119 is selected in the latter half in the frame. Especially, when the read control signal is 2 or 7, the reading from the N frame memory 115 is not performed as intended by the read control signal 115. Then, the switch 111 selects the output field as intended by the read control signal 115.

TABLE 3

Operation of switch

| Combination of read control signals 115 of prior and current frames | Active in the switch 111 |
|---|---|
| 0-0 | HH |
| 0-1 | HH |
| 0-2 | HL |
| 0-3 | HH |
| 0-4 | HH |
| 0-5 | HH |
| 0-6 | HH |
| 0-7 | HH |
| 1-0 | HH |
| 1-1 | HH |
| 1-2 | HH |
| 1-3 | HH |
| 1-4 | HH |
| 1-5 | HH |
| 1-6 | HH |
| 1-7 | HH |
| 2-0 | LL |
| 2-1 | LL |
| 2-2 | LL |
| 2-3 | LL |
| 2-4 | LL |
| 2-5 | LL |
| 2-6 | LL |
| 2-7 | LL |
| 3-0 | HH |
| 3-1 | HH |
| 3-2 | HH |
| 3-3 | HH |
| 3-4 | LL |
| 3-5 | LL |
| 3-6 | LL |
| 3-7 | LL |
| 4-0 | HH |
| 4-1 | HH |
| 4-2 | HL |
| 4-3 | HH |
| 4-4 | HH |
| 4-5 | HH |
| 4-6 | HH |
| 4-7 | HH |
| 5-0 | HH |
| 5-1 | HH |
| 5-2 | HH |
| 5-3 | HH |
| 5-4 | HH |
| 5-5 | HH |
| 5-6 | HH |
| 5-7 | HH |
| 6-0 | LL |
| 6-1 | LL |
| 6-2 | LL |
| 6-3 | LL |
| 6-4 | HH |
| 6-5 | HH |
| 6-6 | HH |
| 6-7 | HH |
| 7-0 | HH |
| 7-1 | LL |
| 7-2 | LL |
| 7-3 | LL |
| 7-4 | LL |
| 7-5 | LL |
| 7-6 | LL |
| 7-7 | LL |

Next, the video signal processor having the components to be operated as explained above is explained on slow reproduction of 1/3 times speed for a case of N=1, M=10 and N=10. For signals reproduced with the magnetic head 101, a reproduction processor 102 performs reproduction processes such as amplification and equalization for waveform. Then, an inner correction decoder 103 receives signals in the unit of sync block on recording and performs inner correction according to the parity codes for inner correction. The position detector 104 detects first and second position informations in the data which have been subjected to inner correction in the unit of sync block and generates the position signal 105. Further, the data which have been subjected to inner correction in the unit of sync block are also output to an outer correction decoder 106 and written to the memory 107 for outer correction at predetermined positions. The data written in the memory 107 are subjected to outer correction based on parity codes which have been added on recording in the unit of sync block for a predetermined number of data. After one page of the data which have been subjected to outer correction are provided, the data are subjected to high efficiency decoding by the high efficiency decoder 108 and recorded in the frame memory 109 as data in the unit of one frame. The read controller 114 outputs the read control signal 115 shown in Table 1 in correspondence to the position signal 105, the direction signal 112 which represents reproduction of normal direction and the speed signal 113 which represents slow reproduction according to an algorithm shown in FIG. 7. The memory controller 116 supplies signals to read field signals from the frame memory 109, as shown in Table 2, according to the read control signal 115. The switch 111 selects the field signals 118 or the delayed field signals 119 to be output through the output terminal 117, as shown in Table 3, according to the enable signal supplied by the enable signal generator 120 according to the read control signal 115.

Next, flow of signals on the above-mentioned slow reproduction is explained with reference to the time chart shown in FIG. 7 on slow reproduction of 1/3 times speed, wherein reference sign "A" represents a page on the tape. If N=1, the page and the frame have the same unit, and Z, A and B represents page in frames. Data "B" represents determined second position information, signal "C" represents position signal 105, signal "D" represents direction signal 112, signal "E" represents speed signal 113, signal "F" represents frame signal as a reference in the system, page "G" represents page subjected to outer correction, frame "H" represents frame to be written to the N frame memory 109, signal "I" represents read control signal 115, field "J" represents field to be read from the N frame memory 109, wherein for example A1 and A2 denote first field and second field, signal "K" represents output from the FIFO memory 110, reference sign "L" represents active side of the switch 111, and field "M" represents field to be output through the output terminal 117.

Figure 7:
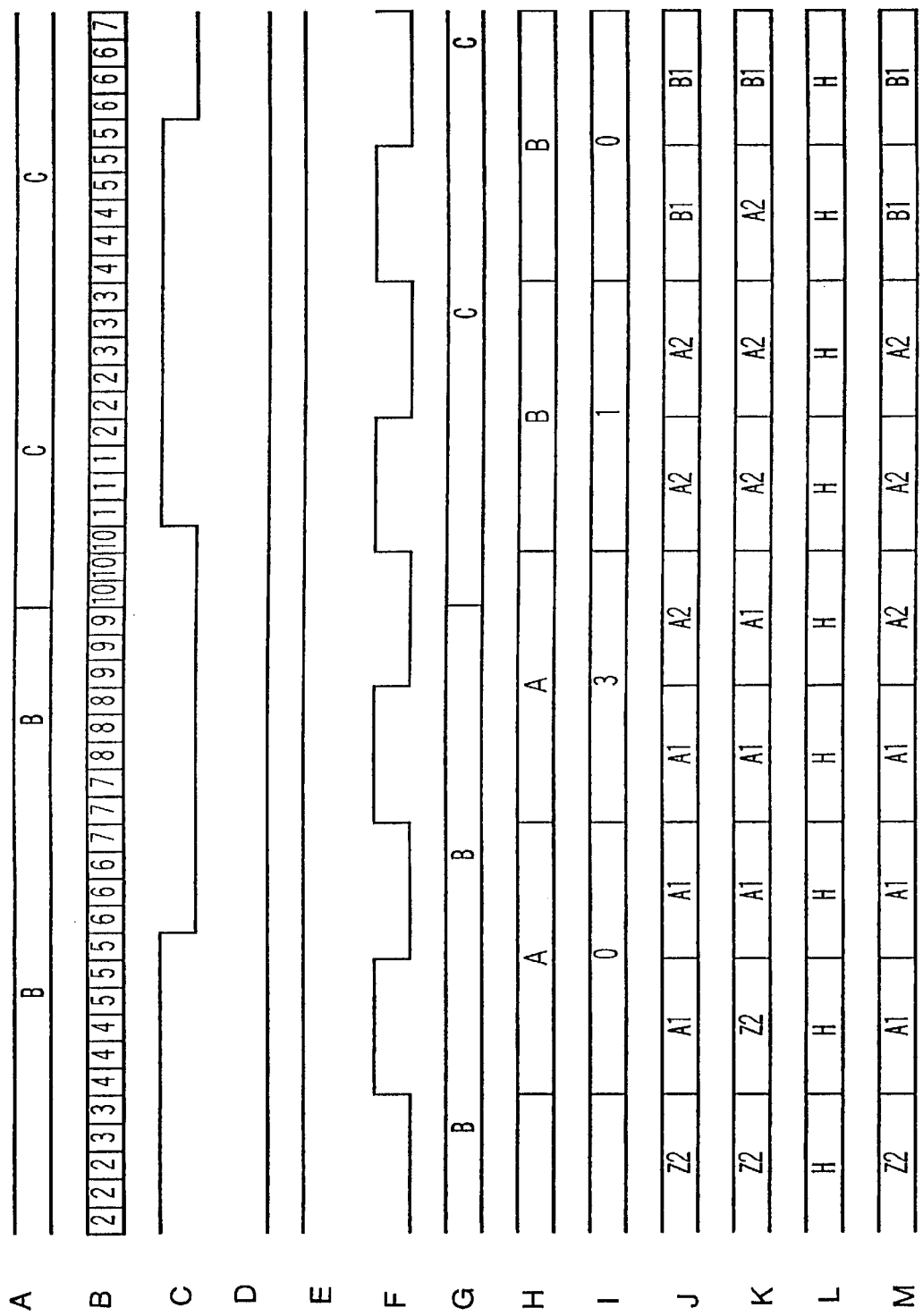
FIG. 7 is a time chart on slow reproduction of 1/3 times speed with a video signal processor according to an embodiment of the invention (in a case of N=1, M=10, and P=10)

In FIG. 7 only second position information (B) is shown. However, because N=1, the position signal 105 (C) is generated only according to the second position information. In the slow reproduction of 1/3 times speed, direction signal (D) is at low level, and speed signal (E) is at high level. The page (G) is the same page as the reproduced page, the frame (H) is a frame written in a page before the page (G) by one page, and the read control signal (I) is derived from Table 1, according to the algorithm shown in FIG. 7. An image in slow reproduction of 1/3 times speed is output through the output terminal 117 (M) by operating the field "J" and the active side "L" of the switch 111 according to the read control signal 115 (I). In this case, data (J) read from the N frame memory 109 are output through the output terminal 117 (M), and the output fields are changed as Z2, A1, A1, A1, A2, A2, A2, B1 and the like. Thus, the output time for output fields becomes even, and the movement of image in slow reproduction becomes smooth.

Figure 8:
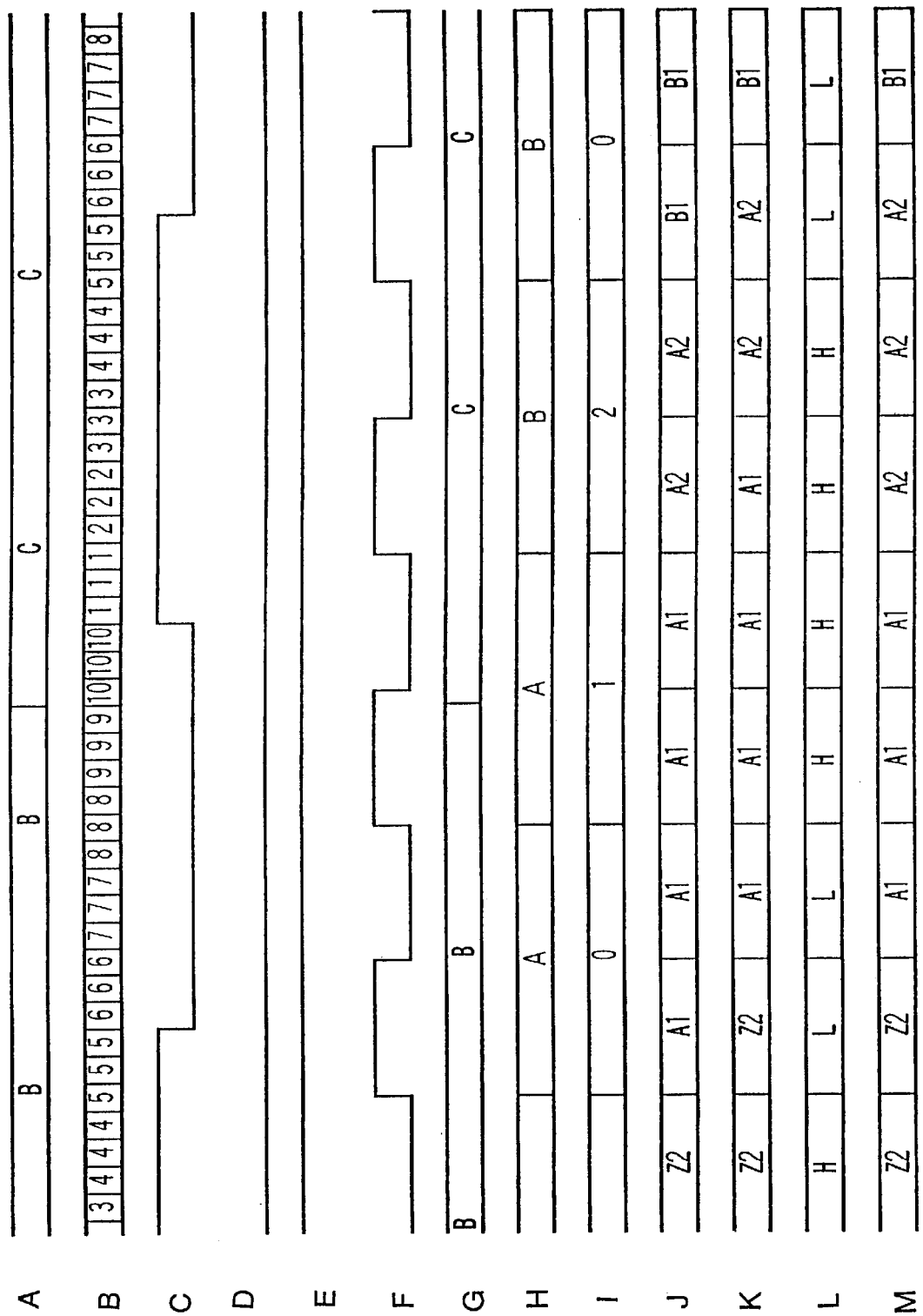
FIG. 8 is another time chart on slow reproduction of 1/3 times speed with the signal processor according to an embodiment of the invention (in a case of N=1, M=10, and P=10).

FIG. 8 shows a time chart where the position signal 105 (C) has different phase relative to frame signal (F) from FIG. 7. In this case, there is a condition that the read control signal 115 (I) is 2. The output fields (J) from the N frame memory 109 become A1, A1, A1, A1, A2 and A2. Then if these output fields are output, the output time of the output fields do not become even, and the movement becomes awkward. Then, by using the switch 111, the output from the N frame memory 109 and the output from the FIFO memory 110 are controlled according to the read control signal 115. Thus, output fields from the output terminal 117 (M) are Z2, Z2, A1, A1, A1, A2, A2, A2 successively, so that the output time of the output fields becomes even and the movement of image in slow reproduction becomes smooth.

As explained above, in a digital video cassette recorder, the position on the tape is detected on reproduction, and the read from the N frame memory 110 and the change in the switch 111 are controlled according to the detected position. Then, the output time of the output fields becomes even, and the motion of image becomes smooth in slow reproduction.

In the above-mentioned embodiment, a frame consists of two fields. However, the invention can also be applied to examples if a frame does not consist of fields. The invention can be applied to cases where signals of a page of N frames are reproduced from M tracks.

In the above-mentioned embodiment, data are recorded and reproduced with shuffling. However, the invention can also be applied to examples when shuffling is not used.

The invention can be applied to various types of reproduction. For example, it can be applied to intermittent slow reproduction.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus reproducing signals recorded on a tape in slow reproduction, wherein the signals are compressed to digital data and recorded in predetermined M tracks (M≧1) on a tape with helical scan in the unit of a page consisting of N frames (N≧1), and position data representing position in the M tracks are added to the digital data on recording at predetermined positions in the M tracks, comprising:

a reproduction processor which converts signals reproduced from a magnetic tape to compressed digital data;

a decoder which decodes the compressed digital data reproduced by said reproduction processor to digital data;

a first storage device which stores the data decoded by said decoder in the unit of N frames;

a second storage device which delays data received from said first storage device by a time of a frame;

a position detector which detects the position data in the data reproduced by said reproduction processor to determine which reproduction position is reproduced by said reproduction processor in an area where the data in a page are recorded;

a read controller which receives the determined reproduction position from said position detector during a frame period and generates a control signal according to the determined reproduction position observed during a frame period, the control signal being determined to make output time of a frame even;

a memory controller which controls reading from said first storage device according to the control signal received from said read controller; and a switch which selects data to be output between data received from said first storage device and data received from said second storage device according to the control signal received from said read controller.

2. The apparatus according to claim 1, wherein a frame consists of two fields, said second storage device delays data received from said first storage device by a time of a field, and said read controller generates the control signals by checking whether reproduction of an area of M/(2N) tracks of an area recording the data of one page is completed in the former half or in the latter half of a frame period and whether the completion of the reproduction of an area of M/(2N) tracks is zero, one or two times in a frame period, the control signal being determined to make output time of a field even.

3. The apparatus according to claim 1, said memory controller controls the reading according to a combination of the control signal of a prior frame and that of a current frame.

4. The apparatus according to claim 1, said switch selects the data to be output according to a combination of the control signal of a prior frame and that of a current frame.

5. The apparatus according to claim 1, said decoder comprising an inner correction decoder and an outer correction decoder, the position data being added to the digital data subjected to outer correction, said inner correction decoder subjecting the data reproduced by said reproduction processor to inner correction decoding, said read controller receiving the data from said first inner correction decoder and detecting the position data therein.

6. The apparatus according to claim 1, wherein the position data includes a first position information representing a position in a track and a second position information representing a track in the M tracks.

7. The apparatus according to claim 6, wherein said position detector determines the second position information detected at the last in a scan and detects the first position information detected first after the determined second position information is changed.

8. The apparatus according to claim 6, wherein said position detector determines the second position information with a margin on the second position information detected currently.

9. The apparatus according to claim 1, wherein data are recorded to the tape with shuffling in the M tracks and said reproduction processor converts the signals to the digital data without shuffling.

10. The apparatus according to claim 1, wherein said read controller generates the control signal further by taking direction of tape running into account.

11. A method for reproducing signals recorded on a tape in slow reproduction, wherein the signals are compressed to digital data and recorded in M tracks (M≧1) on a tape with helical scan in the unit of a page consisting of N frames (N≧1), and position data representing position in the M tracks are added to the digital data on recording at predetermined positions in the M tracks, comprising the steps of:

converting signals reproduced from a magnetic tape to compressed digital data;

detecting the position data in the reproduced data to determine which reproduction position is reproduced in an area where the data in a page are recorded;

generating a control signal according to the determined reproduction position observed during a frame period, the control signal being determined to make output time of a frame even;

decoding the reproduced digital data;

storing the decoded data in a first storage device in the unit of N frames;

storing data received from the first storage device in a second storage device for delay by a time of a frame;

controlling reading from the first storage device according to the control signal; and selecting data to be output between data received from the first storage device and data received from the second storage device according to the control signal.

12. The method according to claim 11, wherein a frame consists of two fields, data received from the first storage device is delayed by a time of a field, and the control signal is generated by checking whether reproduction of an area of M/(2N) tracks of an area recording the data of one page is completed in the former half or in the latter half of a frame period and whether the completion of the reproduction of an area of M/(2N) tracks is zero, one or two times in a frame period, the control signal being determined to make output time of a field even.

13. The apparatus according to claim 11, wherein the position data includes a first position information representing a recording position in a track and a second position information representing a track position in the M tracks.

* * * * *